(12) United States Patent
Proulx et al.

(10) Patent No.: US 7,247,245 B1
(45) Date of Patent: *Jul. 24, 2007

(54) FILTRATION CARTRIDGE AND PROCESS FOR FILTERING A SLURRY

(75) Inventors: Stephen Proulx, Boxboro, MA (US); George Perivolotis, Littleton, MA (US); Zhenwu Lin, Taipei (TW); Gregory Straeffer, North Chelmsford, MA (US); George A. Gagne, Dracut, MA (US); Kenneth King, West Newbury, MA (US); Ralph J. Stankowski, Westford, MA (US)

(73) Assignee: Entegris, Inc., Chaska, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/913,977

(22) PCT Filed: Dec. 2, 1999

(86) PCT No.: PCT/US99/28501

§ 371 (c)(1),
(2), (4) Date: Aug. 20, 2001

(87) PCT Pub. No.: WO00/32290

PCT Pub. Date: Jun. 8, 2000

(51) Int. Cl.
*B01D 37/00* (2006.01)
*B01D 25/00* (2006.01)
*B01D 27/00* (2006.01)
*B01D 29/46* (2006.01)
*B01D 29/56* (2006.01)

(52) U.S. Cl. ............ 210/767; 210/335; 210/438; 210/440; 210/443; 210/446; 210/450; 210/455; 210/456; 210/489

(58) Field of Classification Search ........... 210/455, 210/483, 484, 488, 489, 492, 503, 507, 508, 210/446, 645, 767, 768, 805, 435, 438, 440, 210/443, 494.3
See application file for complete search history.

(56) References Cited

U.S. PATENT DOCUMENTS

| 604,931 | A | * | 5/1898 | Eisendrath | 210/445 |
| 638,742 | A | * | 12/1899 | Murphy | 210/117 |
| 1,934,251 | A | | 11/1933 | Austin | |
| 2,288,426 | A | * | 6/1942 | Stack | 210/489 |
| 2,750,047 | A | * | 6/1956 | Angustus | 210/343 |
| 3,003,643 | A | * | 10/1961 | Thomas | 210/491 |
| 3,593,854 | A | * | 7/1971 | Swank | 210/326 |

(Continued)

FOREIGN PATENT DOCUMENTS

DE 1786334 12/1971

(Continued)

*Primary Examiner*—Robert James Popovics
(74) *Attorney, Agent, or Firm*—John E. Pillion; Timothy J. King

(57) ABSTRACT

A depth filter design is disclosed which has little if any open void area upstream of the media. Preferably, it also has little if any open void area downstream of the media as well. A preferred embodiment uses layers of stacked, fibrous media with several of the layers being separated from the others by spacers which serve to compress the media and to prevent the bypass of fluid around the media adjacent the inner wall of the housing. Several designs for attaching the end caps which allow for the compression of the media are also disclosed.

16 Claims, 11 Drawing Sheets

U.S. PATENT DOCUMENTS

| | | | | |
|---|---|---|---|---|
| 4,115,277 A | * | 9/1978 | Swank | 210/436 |
| 4,661,250 A | * | 4/1987 | Rosenberg | 210/352 |
| 4,744,901 A | * | 5/1988 | Drori | 210/323.1 |
| 4,793,922 A | * | 12/1988 | Morton | 210/317 |
| 4,793,928 A | * | 12/1988 | Tsukamoto et al. | 210/344 |
| 4,839,048 A | | 6/1989 | Reed et al. | |
| 4,844,806 A | * | 7/1989 | Drori | 210/448 |
| 4,880,537 A | * | 11/1989 | Drori | 210/323.1 |
| 4,925,572 A | * | 5/1990 | Pall | 210/767 |
| 4,966,702 A | * | 10/1990 | Drori | 210/448 |
| 5,069,790 A | * | 12/1991 | Mordeki | 210/323.1 |
| 5,139,685 A | * | 8/1992 | de Castro et al. | 210/767 |
| 5,338,448 A | * | 8/1994 | Gjerde | 210/198.2 |
| 5,368,729 A | * | 11/1994 | Stefkovich et al. | 210/266 |
| 5,391,298 A | * | 2/1995 | Pieper et al. | 210/638 |
| 5,472,600 A | * | 12/1995 | Ellefson et al. | 210/317 |
| 5,472,605 A | * | 12/1995 | Zuk, Jr. | 210/436 |
| 5,536,286 A | * | 7/1996 | Freeman | 55/322 |
| 5,595,651 A | | 1/1997 | Pavel | |
| 5,595,653 A | * | 1/1997 | Good et al. | 210/289 |
| 5,797,978 A | * | 8/1998 | Rosenberg et al. | 95/74 |
| 5,798,041 A | * | 8/1998 | Zuk, Jr. | 210/456 |
| 5,938,940 A | * | 8/1999 | Zuk, Jr. | 210/767 |
| 6,093,230 A | * | 7/2000 | Johnson et al. | 55/482 |
| 6,827,851 B1 | * | 12/2004 | Strohm et al. | 210/228 |
| 6,846,412 B2 | * | 1/2005 | Hogan et al. | 210/227 |
| 6,918,951 B2 | * | 7/2005 | Rosenberg | 96/60 |
| 7,153,425 B2 | * | 12/2006 | Stankowski et al. | 210/335 |
| 2003/0159981 A1 | * | 8/2003 | Diemer et al. | 210/346 |
| 2005/0011840 A1 | * | 1/2005 | Stankowski et al. | 210/767 |
| 2005/0016936 A1 | * | 1/2005 | Stankowski et al. | 210/767 |
| 2005/0061729 A1 | * | 3/2005 | Strohm et al. | 210/284 |
| 2005/0121379 A1 | * | 6/2005 | Strohm et al. | 210/284 |

FOREIGN PATENT DOCUMENTS

| | | |
|---|---|---|
| DE | 3516341 | 11/1986 |
| DE | 3516341 A1 * | 11/1986 |
| DE | 3741552 A1 * | 6/1989 |
| WO | WO 97/35125 | 9/1997 |

* cited by examiner

FILTRATION CARTRIDGE AND PROCESS FOR FILTERING A SLURRY

The present invention relates to a filter and a process for filtering particle containing or slurry like materials. More particularly, it relates to a depth filter and process for filtering slurries and compositions containing particles and/or gels such as CMP (chemical-mechanical planarization) slurries, photoresist chemicals and biological fluids such as transgenic milk or serum, blood and fermentation broths.

BACKGROUND OF THE INVENTION

A fluid composition containing a particulate solid component is referred to in the art as a "slurry". The solid component can be any of a variety of materials including solid particles, cell components, flocculating agents, gel particles or the like. These are found in many applications including photoresist chemicals, biopharmaceutical products and abrasive materials for the semiconductor industry. Photoresist chemical compositions often contain gels and agglomerates of gels which are formed from the photoresist chemical due to shear, shock or age of the chemicals. Such gels and agglomerates need to be removed prior to using these chemical compositions. Biopharmaceutical liquid compositions such as cell broths, fermentation liquids, transgenic milks and other transgeric liquids, blood, blood fractions or other bacterial or animal fluids or secretions, contain whole cells, cell components, fats and other solids which need to be removed to in order to further process and recover desired components of these compositions.

Of particular interest are slurry compositions utilized in CMP to polish wafers in VLSI and ULSI integrated circuit devices. High pH silica CMP slurries are utilized to polish dielectric and polysilicone layers. In addition, acidic silica and alumina or metal/metal oxide abrasive based slurries are utilized to polish metal interconnects. The CMP process uses submicron (30-500 nm) abrasive particles at a typical concentration of 1-30% by weight particles.

The typical specification for commercial CMP slurries includes percent solids, pH, specific gravity, mean particle size and general (bulk) particle size distribution. However, a small number of "large" particles (>1 um) have been found which fall outside of the specified size distribution. These particles can be aggregates, agglomerates or gels and may be formed from agglomeration, settling, system or pH shock or local drying of slurry. The large particles and agglomerates can cause microscratches and they, together with the gels cause other defects on planarized wafer surfaces during CMP processing. Slurry filtration to remove these relatively large particles has proven to be beneficial in reducing wafer defects and increasing yields in CMP processes. At the present time a wide variety of filter cartridge constructions are utilized to purify fluids. These cartridge constructions are designed to remove solids and colloidal particles as well as microorganisms. The basic two separate and distinct types of cartridges used in filtration of gases and liquids are depth filters (typically wound) and surface or screen filters (usually pleated). A depth filter is primarily used to remove most of the contaminants and particles. It is typically utilized upstream of a surface or screen filters. The most important properties for a depth filter are its "dirt holding capacity" or throughput, pressure drop and retention. The filter design allows contaminants and particles to be trapped in stages within the depth of the filter due to the construction of the multiple layers of various media types. A wound depth filter has multiple layers with the most open media (largest micron retention rating), i.e., largest pore size usually the outermost layer, adjacent the liquid inlet with the tightest media at the core adjacent the liquid outlet will have the least amount of surface area due to the smallest diameter around which it is wrapped. The layer at the core contributes to most of the pressure drop of the cartridge because the media has the highest pressure drop and the least amount of filtration surface area. Likewise, this layer will significantly reduce the capacity of the filter due to both the low filtration surface area and the smallest micron retention rating.

Presently available depth filters are positioned within a housing, spaced apart from the interior housing walls thereby to form a void volume upstream of the depth filter. This spacing is effected to permit either the introduction of a fluid feed into the entire filter or the removal of the entire permeate from the filter. If this spacing were not maintained, fluid flow through the filter can be severely restricted. As a result, a relatively large high fluid hold-up volume occurs in a conventional filter unit. A depth filter construction utilizing such a spacing also is disadvantageous for filtering a slurry since the particles in the slurry can settle out of the slurry on and within the filter. This results in rapid plugging of the filter, particularly at low flow rate point of use applications.

Depth filters comprising a relatively deep bed of filter material are undesirably compressible under the pressure of fluid entering the filter bed. Filter bed compressibility depends upon the type of filter, retention characteristics of the filter and thickness of the depth filter. For example, thick filter beds are more compressible than thinner filter beds. When the filter bed is compressed, void volume is reduced and, the probability of plugging is increased. This results in an undesirably short useful life of the filter. In addition, compression of the filter bed requires that the pressure of feed fluid be increased in order to maintain desired fluid through put rates. These conditions of increased pressure increase the probability that undesirable channeling of fluid in the space between the filter housing and the filter bed results. Such channeling is undesirable since the channeled fluid does not pass through the filter bed and undesirably large particles are not removed from the fluid.

A surface or screen filter will retain virtually 100% of the particles or contaminants for which it is rated. The media used in surface or screen filter typically has a high pressure drop and low "dirt holding capacity" or throughput because of its high retention efficiency. The media normally used in a surface filter comprises glass or polymeric microfibers. Particles are retained by size exclusion primarily on the surface of the screen filter rather than within the depth of the filter. Particles smaller than the controlled pore size tend to be trapped within the media of the surface filter. However, as a result of the controlled pore structure, they provide more predictable filtration than depth filters. Screen filters are not useful for filtering a slurry since they will become plugged quickly by the solid particles and gels in the slurry.

Accordingly, it would be desirable to provide a filter cartridge including a depth filter for filtering a slurry which effectively removes undesirably large solid particles and gels. In addition, it would be desirable to provide such a filter cartridge which permits passage there through of particles in the slurry within a desired particle size range. Furthermore, it would be desirable to provide such a filter cartridge wherein compression of the depth filter is controlled to substantially prevent compression of the depth filter and channeling of the slurry being filtered.

SUMMARY OF THE INVENTION

The present invention comprises a process for filtering a slurry and a filter cartridge construction for filtering a slurry having a filtration medium formed of a depth filter such as a cylindrical seamless fibrous depth filter comprising a nonwoven fibrous mass, woven fibers, a plurality of nonwoven fibrous layers of a fibrous felt or the like or a wound depth filter retained within a housing substantially free of an open void volume upstream of the depth filter which causes separation of solid particles from a slurry being filtered.

The filtration medium is preferably divided into a plurality of depth filter segments by spacers having an open central portion. The spacers serve to divide the depth filter medium and to allow fluid to pass there through. By utilizing the spacers, the compressibility of the filtration medium is substantially reduced. The spacers also prohibit channeling along the inner wall of the housing during filtration. By the term "open void volume" as used herein is meant a volume free of a material including materials for forming a depth filter and is not meant to include the void volume normally encountered in conventional filter-housing construction.

One end of the cartridge of this invention is sealed with a cap having a fluid inlet while the opposing end is sealed with a cap having a fluid outlet. When the filtration medium is a wound depth filter, it is positioned around a core which extends substantially the length of the cartridge. When the depth filter comprises a nonwoven fibrous mass, it is compressed to effect the desired percent retention efficiency of the mass. The depth filter also can comprise a layered filter construction having a plurality of filtration media, each having a controlled percent retention rating. The layers of the depth filter are formed of felt layers, of wound or layered flat filtration sheets, woven fibers or of a fibrous mass of nonwoven polymeric fibers secured together by mechanical entanglement or interweaving of the fibers. The filter cartridges of this invention retain undesirably large particles and gel particles which permitting passage there through of particles of a slurry having a size within a desired size range.

It is an object of the present invention to provide a filter cartridge for filtering a slurry composition which comprises a hollow housing having a first end including an inlet and a second end including an outlet, said hollow housing being filled with a depth filter and being free of an open void volume upstream of said depth filter.

It is another object of the present invention to provide a filter cartridge for filtering a slurry composition which comprises a hollow housing having a first end including an inlet and a second end including an outlet, said hollow housing being filled with a depth filter and being free of an open void volume upstream of said depth filter and said depth filter is formed of segments separated by annular spacers.

It is another object of the present invention to provide a filter cartridge for filtering a slurry composition which comprises a hollow housing having a first end including an inlet and a second end including an outlet, said hollow housing being filled with a depth filter and being free of an open void volume upstream of said depth filter, said depth filter is formed of segments separated by annular spacers, and the inner walls of the housing adjacent the ends of the housing have one or more slots formed therein, the end caps contain one or more C-rings and the C-rings secure the end caps to the housing by fitting at least partially into the one or more slots of the housing.

DESCRIPTION OF THE SPECIFIC EMBODIMENTS

Figure 1A:
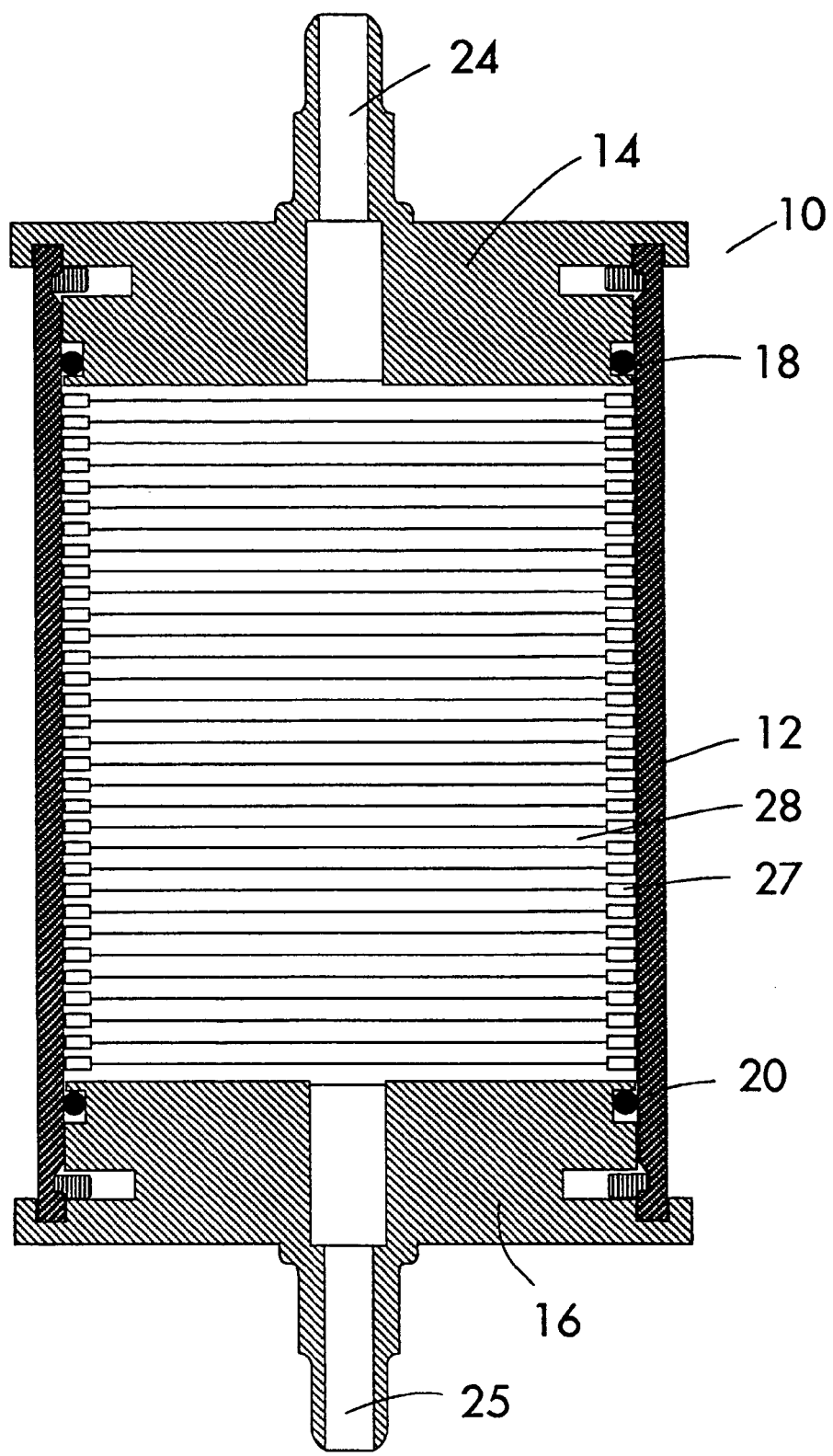
FIG. 1A is a cross-sectional view of the filter cartridge of this invention.

The present invention provides a filter cartridge construction which comprises (1) a depth filter comprising either (a) a wound depth filter, (b) a stack of depth filters or (c) a cylindrical seamless fibrous depth filter formed from a fibrous mass of fibers. The depth filter has a thickness in the direction of fluid flow there through of between about 1 and about 18 inches, preferably between about 3 and about 12 inches to attain effective retention of undesirably large particles while permitting passage there through of particles within a desired size range.

The depth filter preferably includes a plurality of annular spacers positioned within the depth filter in order to segment the depth filter into segments. The ratio of depth filter segment thickness to spacer thickness is between about 1.1:1 and about 5:1, preferably is between about 1.5:1 and about 3:1. The spacer comprises an annular ring with an open central portion. The spacer has a thickness between about 0.01 and about 0.12 inches, preferably between about 0.01 and about 0.07 inches. The spacers provide a means for substantially reducing the compressibility of the depth filter during use under the pressure of feed fluid. A spacer providing a depth filter segment to spacer ratio of greater than about 5 is generally ineffective for reducing compressibility of the depth filter. A spacer having a thickness greater than about 0.12 inches is undesirable since it will promote separation of solid particles from a slurry being filtered due to a large space between filter medium segments. In this instance, one may insert or bond a piece of filtration medium into the opening of the spacer to form an essentially continuous medium subject to the flow of fluid through out the length of the filter.

Alternatively, one may eliminate the use of the spacers, especially in shorter lengthed devices or with relatively rigid filtration media or with media used in the form of a wound depth filter or a cylindrical seamless fibrous depth filter formed from a fibrous mass of fibers. However, even here the use of spacers are desirable for the advantages outlined above.

The depth filter of this invention preferably comprises one or a plurality of media each having the same or different micron retention size in the form of a stack of depth filters.

In one embodiment, the depth filter comprises a plurality of media (layers) each having a different micron retention size so that the retention of the media layers is greatest adjacent the fluid outlet from the cartridge. Micron retention size can be varied by controlling the fiber size and/or fiber spacing. Thus, large particles will be retained adjacent the feed inlet and progressively smaller particles will be retained as the feed passes through the filter cartridge. The permeability or retention of the media layers is controlled so that particles in the slurry within a desired particle range pass through the cartridge and through the outlet. It has been found, in accordance with this invention, that the useful life of the cartridge of this invention is at least about 50 percent longer, preferable at least about 200 percent longer than a prior art filter cartridge having a void volume in a housing positioned upstream a depth filter positioned within the housing. Thus, the filter cartridge of this invention permits the use of fewer cartridges for a particular application and cost as compared to the filter cartridges of the prior art. Percent retention efficiency and Beta Ratio are measures of the ability of the ridge to capture and retain particles. The Beta Ratio concept was introduced by the Fluid Power Research Center (FPRC) at Oklahoma State University (OSU) in 1970. Originally developed for use in hydraulic and lubricating oil filters, the test has been adapted by many cartridge manufacturers to measure and predict the cartridge filter performance in aqueous based fields. Beta Ratio is defined by the FPRC as the number of particles greater than a given size (x) in the feed, divided by the number of particles greater than the same size in the effluent. Both percent retention efficiency and Beta Ratio values are calculated for specific particle size ranges.

The following equations showed the relationship between Beta Ratio and percent retention efficiency:

$$\% \text{ Retention Efficiency} = \frac{\text{Number of feed particles} - \text{Number of effluent particles (size } X)}{\text{Number of feed particles (size } X)} \times 100$$

$$\text{Beta Ratio } (B) = \frac{\text{Number of feed particles (size } X)}{\text{Number of effluent particles (size } X)}$$

$$\% \text{ Retention Efficiency} = \frac{B-1}{B} \times 110$$

$$\text{Beta Ratio } (B) = \frac{X}{100 - \% \text{ Retention Efficiency}}$$

In the filter cartridge of this invention, the filter medium of the depth filter having the largest micron retention is preferably positioned adjacent an inlet to the filter cartridge. The filter media of the depth filter having the smallest micron retention is preferably positioned adjacent the outlet from the filter cartridge. The micron retention characteristics of a filter can be varied by varying the diameter of fibers used to form the filter and/or the extent of compression of the fibers such as by winding a filter medium sheet tighter or looser around a core. A tighter wound filter medium gives a higher percent retention efficiency. The intermediate filter media are positioned according to percent retention of efficiency so that incoming slurry is passed sequentially through the filter media having progressively smaller micron retention and lastly through the filter media having the smallest micron retention. Thus the overall filter cartridge presents a percent retention efficiency which comprises a progressive gradient from the inlet to the outlet wherein the percent retention efficiency progressively increases.

Representative media useful for forming the depth filter include the fiber of polyolefins such as polyethylene, polypropylene, cellulose including cellulose/diatomaceous earth or silica blends as are available from Millipore Corporation of Bedford, Mass. under the brandname MILLIS-TACK+, cellulose derivatives such as cellulose acetate, cotton, polyamides, polyesters, fiberglass, polytetrafluoroethylene (PTFE), fluoropolymers such as PFA, MFA and FEP or the like.

The fibrous depth filter is free of seams and is formed of fibers which produce a fibrous mass of fibers. This embodiment of the depth filter can be characterized by a gradation of micron retention characteristics throughout its thickness in the direction of fluid flow through the depth filter. This gradation can be achieved either by varying the void volume of the cylindrical fibrous depth filter medium as a function of thickness in the direction of fluid flow through the filter or by maintaining a constant volume and varying the size of the fibers as a function of depth filter thickness in the direction of fluid flow through the depth filter. In either embodiment all that is necessary is that the gradation of micron retention characteristics is produced. The gradation is effected such that the slurry to be filtered first encounters a layer of the depth filter having a largest micron retention characteristics (i.e. largest pores) and encounters layers having progressively smaller micron retention characteristics (i.e. smallest pores) prior to being directed through the outlet. The seamless cylindrical fibrous depth filter can be formed by any conventional means such as is disclosed in U.S. Pat. Nos. 3,933,557; 4,032,688; 4,726,901 or 4,594,202 which are incorporated herein by reference.

Representative slurries which can be filtered in accordance with this invention include CMP slurries such as silica-based slurries, alumina-based slurries, ceria-based slurries, diamond-based slurries, manganese dioxide-based slurries, titanium and other metal or metal oxide slurries. Additionally, representative biological-type slurries in which the filter of this invention can be used include cell broths whether containing whole cells or ruptured cells or cellular components, fermentation products, a transgeric liquid such as transgeric milk, blood, a blood fraction or other slurries which contain large components which need to be separated from smaller components.

In one method for forming a cylindrical seamless fibrous depth filter, for example, a molten thermoplastic composition is spun from a multiplicity of orifices arranged at an angle to a rotating mandrel. The orifices are positioned at a plurality of distances from the mandrel. Gas is directed at the orifices in a direction generally in the direction of projection of the fibers from the orifices to attenuate and disrupt the fibers into discrete lengths. The fibers are collected and wound on the mandrel to form a generally spiraling wound cylindrical layer of randomly intertwined spun fibers and to form the seamless cylinder which can be removed from the mandrel. Micron retention characteristics for a given layer can be controlled by controlling the rate of exit of fibers from a particular set of orifices which produce a given layer, thereby to control the void volume in that layer.

In a second method, the cylindrical seamless fibrous depth filter is formed in a manner whereby the void volume throughout the filter thickness in the radial direction is essentially constant. The desired micron retention characteristic gradation is achieved by varying the size of the fibers throughout the cylindrical fibrous depth filter in the radial direction. The smallest fibers produce a layer having the smallest micron retention characteristics while the largest fibers produce a layer having the largest micron retention characteristics. The fibers are formed by extruding a molten thermoplastic composition from a fiberizing die. The fibers are attenuated by a gas stream directed to a rotating reciprocating mandrel. The fibers are cooled prior to their collection on the mandrel to a temperature below which the fibers bind to each other to substantially eliminate fiber to fiber bonding. The cooled fibers are collected on the mandrel and are subjected to a compression force to effect a substantially constant void volume through the thickness of the cylindrical seamless fibrous depth filter in the radial direction. The cylindrical and fibers depth filter can be formed on the pleated on a core.

Typically, the void volume of the cylindrical fibrous depth filter ranges between about 60 and 95 percent and varies no more than about 1 to 2 percent. Typically the fibers range in diameter between about 1.6 and 16 micrometers. The compositions for forming the depth filter of this invention also can have specific properties either inherent of added such as hydrophilicity, hydrophobicity, a positive or negative charge or the like. Charged media is particularly useful in the purification of products such as photochemicals including dye solutions, pigment dispersed fluids used in the manufacture of color filters for LCDs and in biological applications such as virus removal and protein separations.

The wound depth filter is formed by winding one or a plurality of filter sheets formed of fibers to form a joint generally cylindrical structure. The filter sheet or sheets have varying pore size such that the micron retention characteristic of a portion of the depth filter as a function of radial position within or on the depth filter. The portion of the wound depth filter positioned adjacent an inlet to the filter cartridge including the wound depth filter has the largest micron retention characteristics while the portion of the wound depth filter having the smallest micron retention characteristics, i.e. the smallest pore size is positioned adjacent the outlet from the filter cartridge. Any intermediate portions of the wound depth filter are positioned according to pore size so that incoming slurry is passed sequentially through portions of the depth filter having progressively smaller micron retention characteristics and lastly through the portion of the filter having the smallest micron retention characteristics. Representative media useful for forming depth filters include the fibers set forth above for the cylindrical seamless fibrous filters.

The depth filter can be formed from one or a plurality of separate filter sheets by stacking the sheets within a housing in a manner such that an open volume within the housing upstream of the depth filter which would promote particle separations from a slurry is avoided. The filter sheet or sheets can have the same pore size or varying pore size such that the micron retention characteristic of a portion of the depth filter varies along the length of the housing. When utilizing sheets having varying pore size, the portion of the filter stack positioned adjacent an inlet to the filter cartridge preferably has the largest micron retention characteristics while the portion of the filter stack having the smallest micron retention characteristics, i.e. the smallest pore size is preferably positioned adjacent the outlet from the filter cartridge. Any intermediate portions of the filter stack are positioned according to pore size so that incoming slurry is passed sequentially through portions of the depth filter having progressively smaller micron retention characteristics and lastly through the portion of the filter having the smallest micron retention characteristics. Representative media useful for forming the filter stack include the fibers set forth above for the cylindrical seamless fibrous filters.

Referring to FIGS. 1A and 18, the filter cartridge 10 of this invention includes a housing 12 and end caps 14 and 16 which are sealed to housing 12 and end caps 14 and 16 which are sealed to housing 12 by means of O-rings 18 and 20. The embodiment of FIG. 1A contains the spacers while the embodiment of FIG. 1B does not. The end caps 14 and 16 can be attached to housing 12 by any conventional means such as by screwed onto or outside threaded surface of housing 12. End cap 14 is provided with an inlet 24 and end cap 16 is provided with an outlet 25. A plurality of stacks of filter sheets 28 are positioned within housing 12 separated by annular spacers 27 throughout the height of the housing 12 not occupied by end caps 14 and 16. Each of the sheets 28 comprises a filter medium as described above. The interior of housing 12 is a free of open volumes. That is, it is completely filled with the stack of filter sheets 28 separated by annular spacers having an open central volume.

Figure 2:
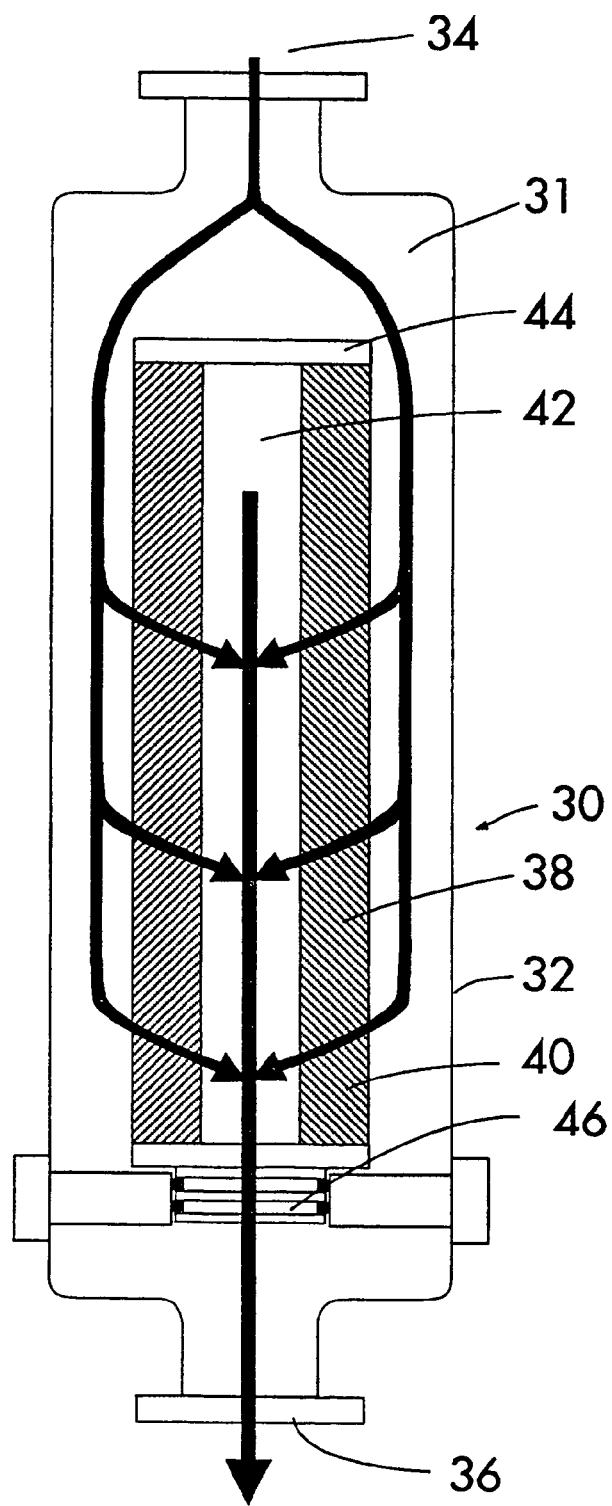
FIG. 2 is a cross-sectional view of the filter cartridge of the prior art.

Referring to FIG. 2, the filter cartridge 30 of the prior art includes a housing 32 having an inlet 34 and an outlet 36. A filter cartridge 38 includes a depth filter 40 wound around a hollow core, an end cap 44 sealed to the core 42 and depth filter 40 and an outlet 46. Each of the sheets 48 comprises nonwoven fibers as described above. The interior of housing 32 includes a void volume 31. When a slurry is filtered with this filter cartridge, the filter becomes plugged rapidly due to precipitation of particles from the slurry onto the exposed surface of the depth filter adjacent the open void volume 31.

Figure 3:
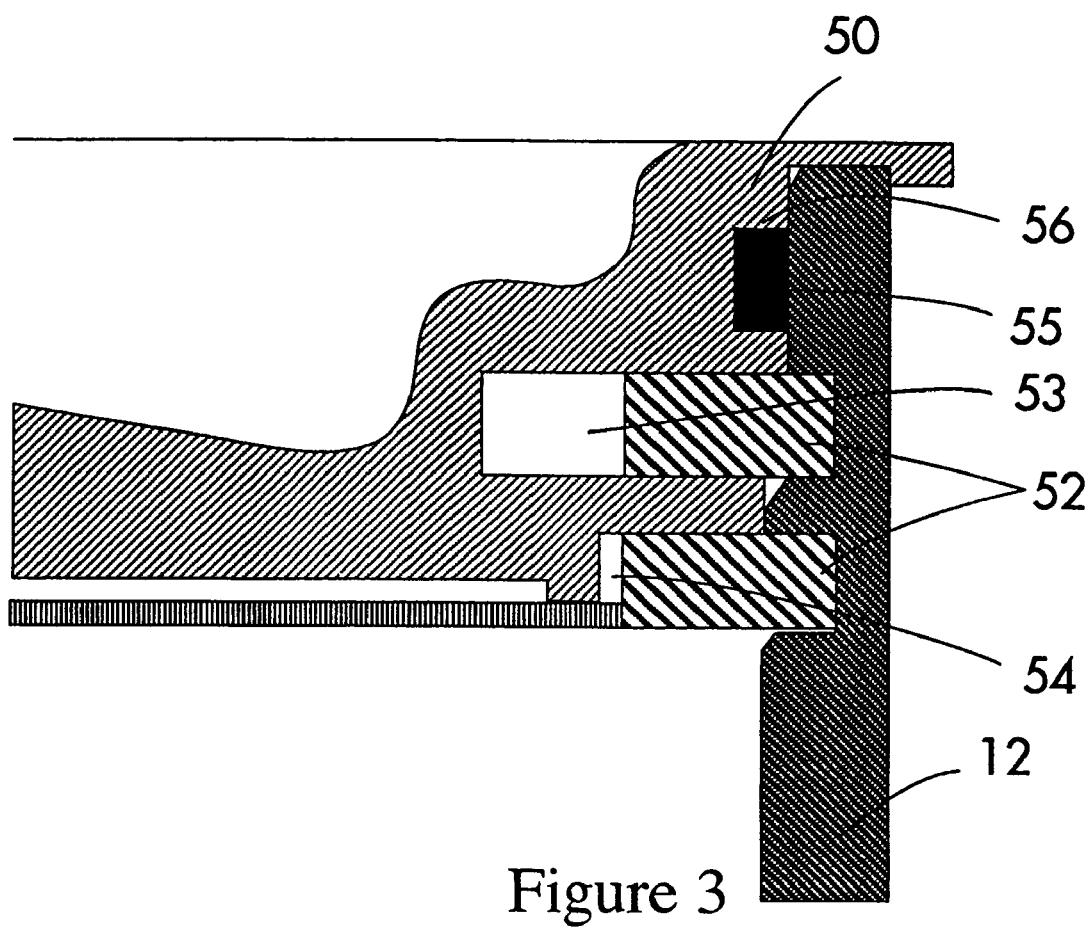
FIG. 3 is a partial cross-sectional view of one end cap embodiment for the depth filter of this invention.
Figure 3A:
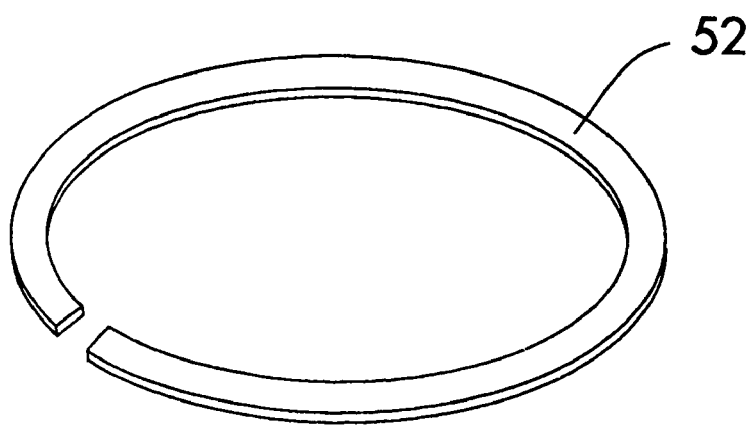
FIG. 3a is a top view of the element of the end cap of FIG. 3.
Figure 4:
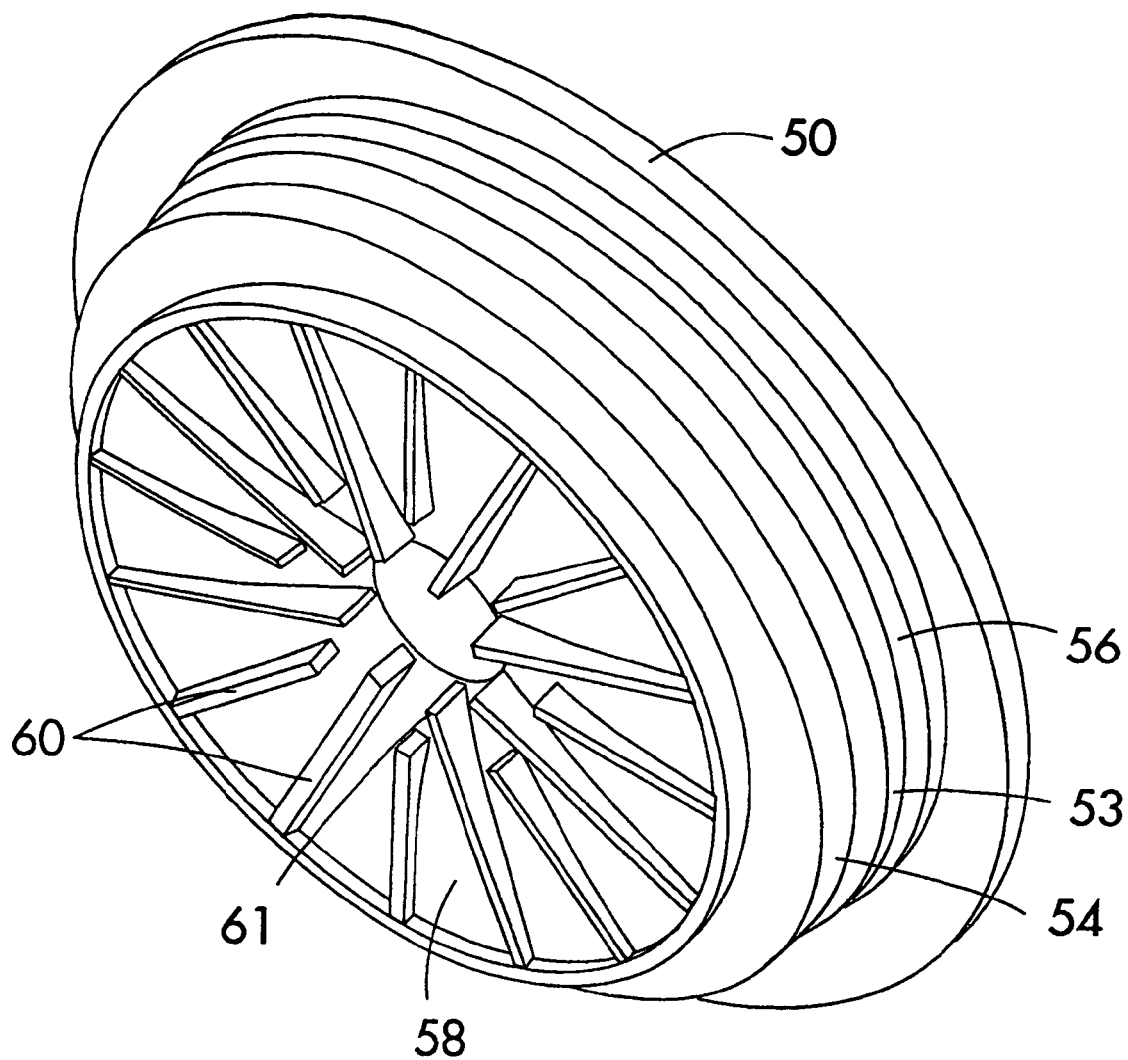
FIG. 4 is an isometric view of the end cap of FIG. 3.

Referring to FIGS. 3, 3A and 4, a preferred end cap construction of this invention is shown. The end cap 50 includes two spring-loaded C-shaped rings 52 which are compressed to fit into slots 53 and 54. The O-ring 55 fits into slot 56. When the end cap 50 is positioned into housing 12, the C-rings 52 are allowed to expand into slots provided in housing 12 to be positioned as shown in FIG. 3. It is to be understood that a single C-shaped ring 52 can also be utilized in this preferred embodiment of the present invention. This C-ring construction provides excellent sealing within the housing to prevent leakage from the housing.

The end cap 51 includes an inner bottom surface 58 having ribs 60 which promotes substantially uniform distribution of incoming fluid feed over atop surface of the depth filter construction of this invention. The maximum height 61 of the ribs is between about 0.25 and about 1.0 inches, preferably between about 0.25 and about 0.5 inches. This height is sufficiently small as to prevent separation of solid particles from a slurry to be filtered while promoting the desired uniform distribution of incoming slurry feed.

Figure 1B:
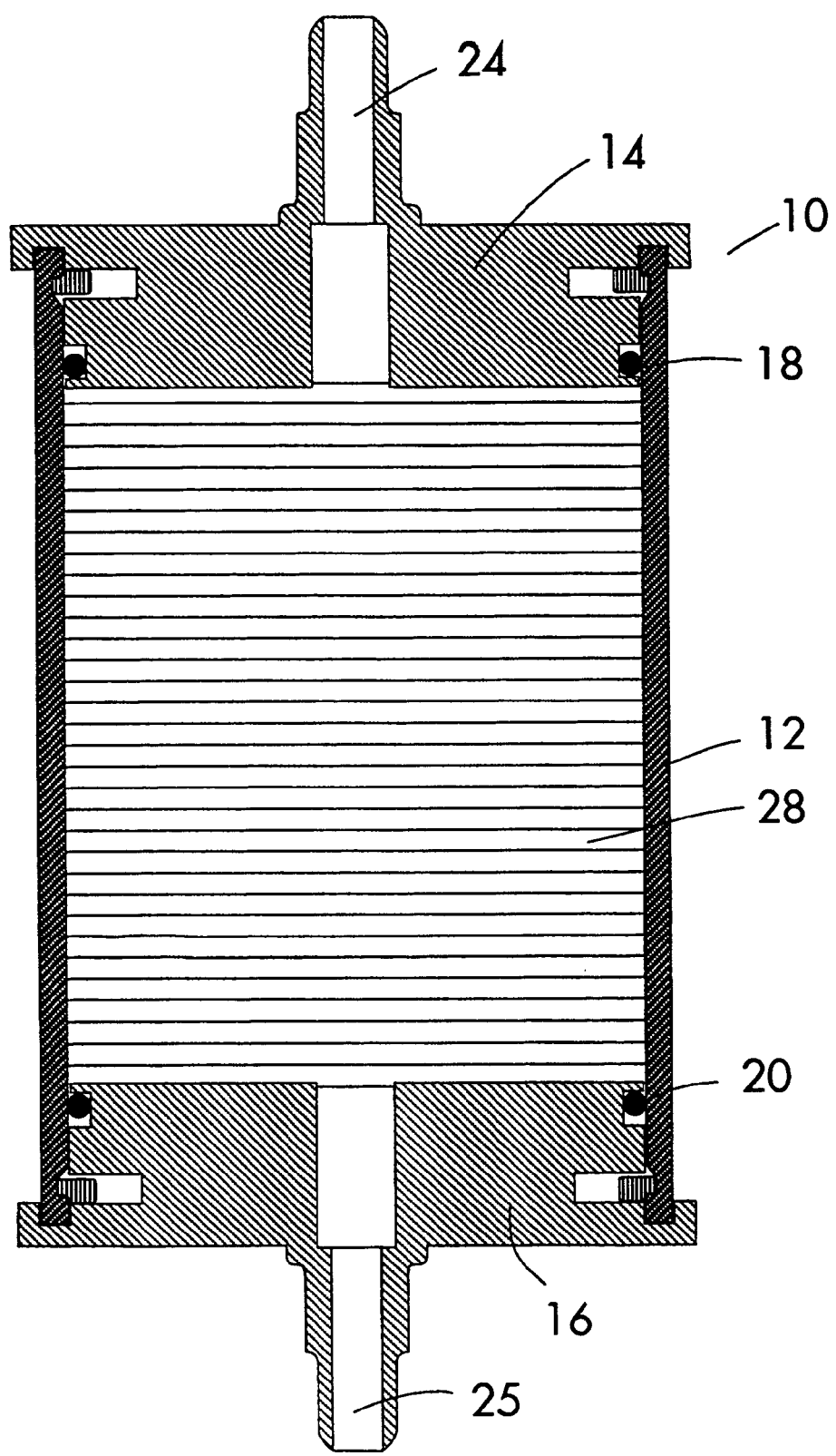
FIG. 1B is a cross-sectional view of another embodiment of the filter cartridge of this invention.
Figure 5:
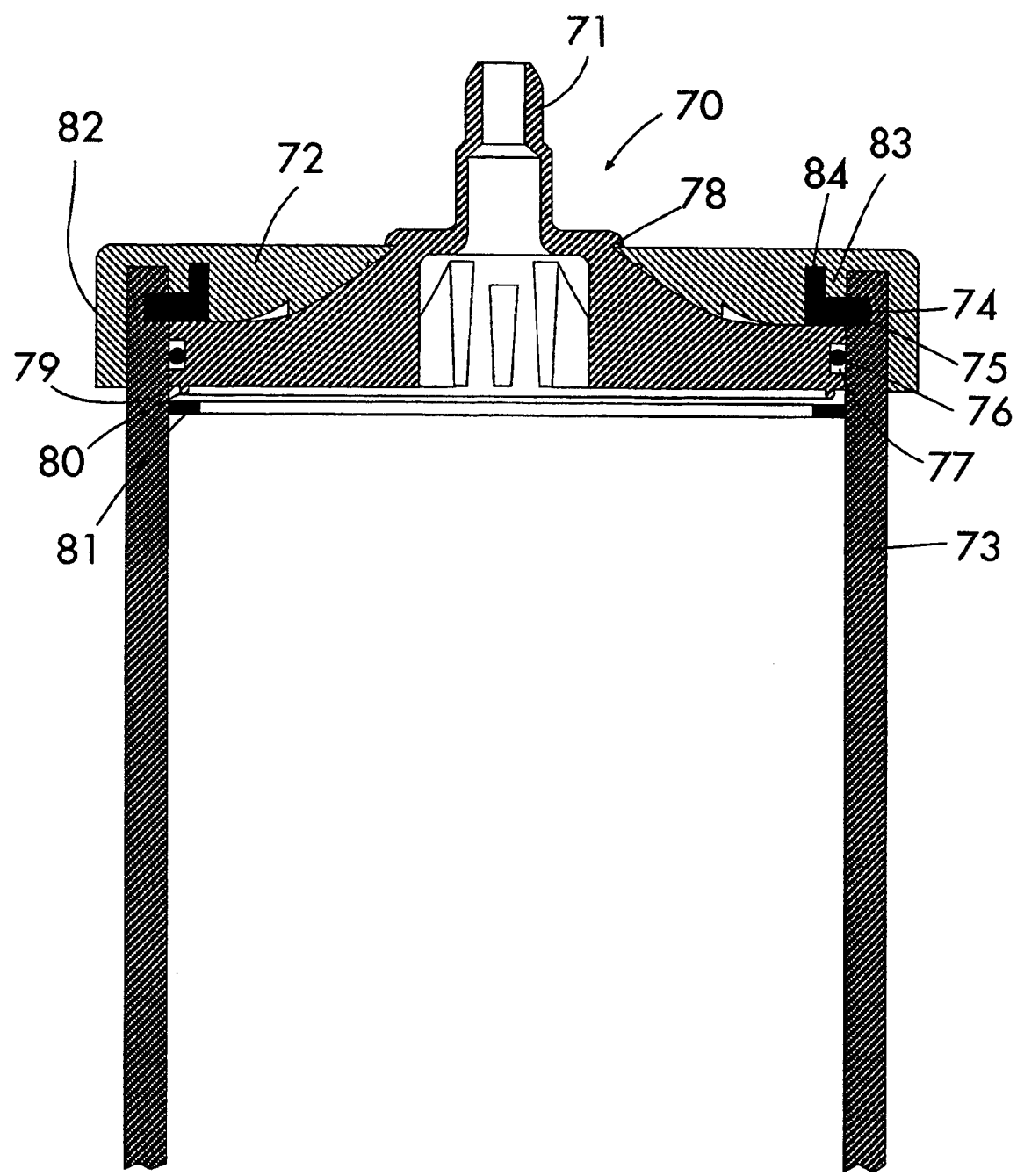
FIG. 5 is a partial cross-sectional view of one end cap embodiment for the depth filter of this invention.

Referring to FIG. 5 a second preferred end cap construction of this invention is shown. The end cap 70 is formed of two pieces 71 and 72 is attached to the top of the filter housing 73 rather than the interior of the housing as is shown in the embodiment of FIGS. 1A and 1B. One spring-loaded C-shaped ring 74 is compressed to fit into slot 75 formed on the inner surface of the housing 73 adjacent an end. The inner cap piece 71 is retained within the bore of the housing below the slot 75 by the ring 74. It also has an O-Ring 76 which fits into slot 77 to prevent any leakage from the interior of the housing. Outer end cap piece 72 is retained to the inner piece 71 by a snap fit 78 between the two pieces. After the inner end cap piece 71 is positioned into housing 73, the C-ring 74 is placed into the housing and allowed to expand into slot 75 provided in housing 73 to be positioned as shown in FIG. 5. It is to be understood that a single C-shaped ring 74 is preferably used in this device although two may be used or one ring may be formed as two halves and used instead. This C-ring construction provides excellent sealing within the housing to prevent leakage from the housing.

The inner end cap piece 71 includes an inner bottom surface 79 having ribs 80 which compress and promote a good seal between the media 81 and the inner cap piece while providing a small space for the substantially uniform distribution of incoming fluid feed over atop surface of the depth filter construction of this invention. The maximum height of the ribs 80 is between about 0.25 and about 1.0 inches, preferably between about 0.25 and about 0.5 inches. This height is sufficiently small as to prevent separation of solid particles from a slurry to be filtered while promoting the desired uniform distribution of incoming slurry feed.

The outer cap piece 72 has an outer lip 82 which extends out over the outer diameter of the housing and along a portion of its side. It also may have a nib 83 which is made to fit between the inner wall of the housing and the upper leg 84 of the C-ring 74.

This end cap design provides several advantages. First it is simpler to manufacture and assemble. It reduces the potential for the media to be deformed (puckering or wrinkling of the upper layer of the media) during assembly which leads to fluid bypass. The nib 83 helps to prevent the cap assembly 70 from flexing when under pressure.

Figure 6:
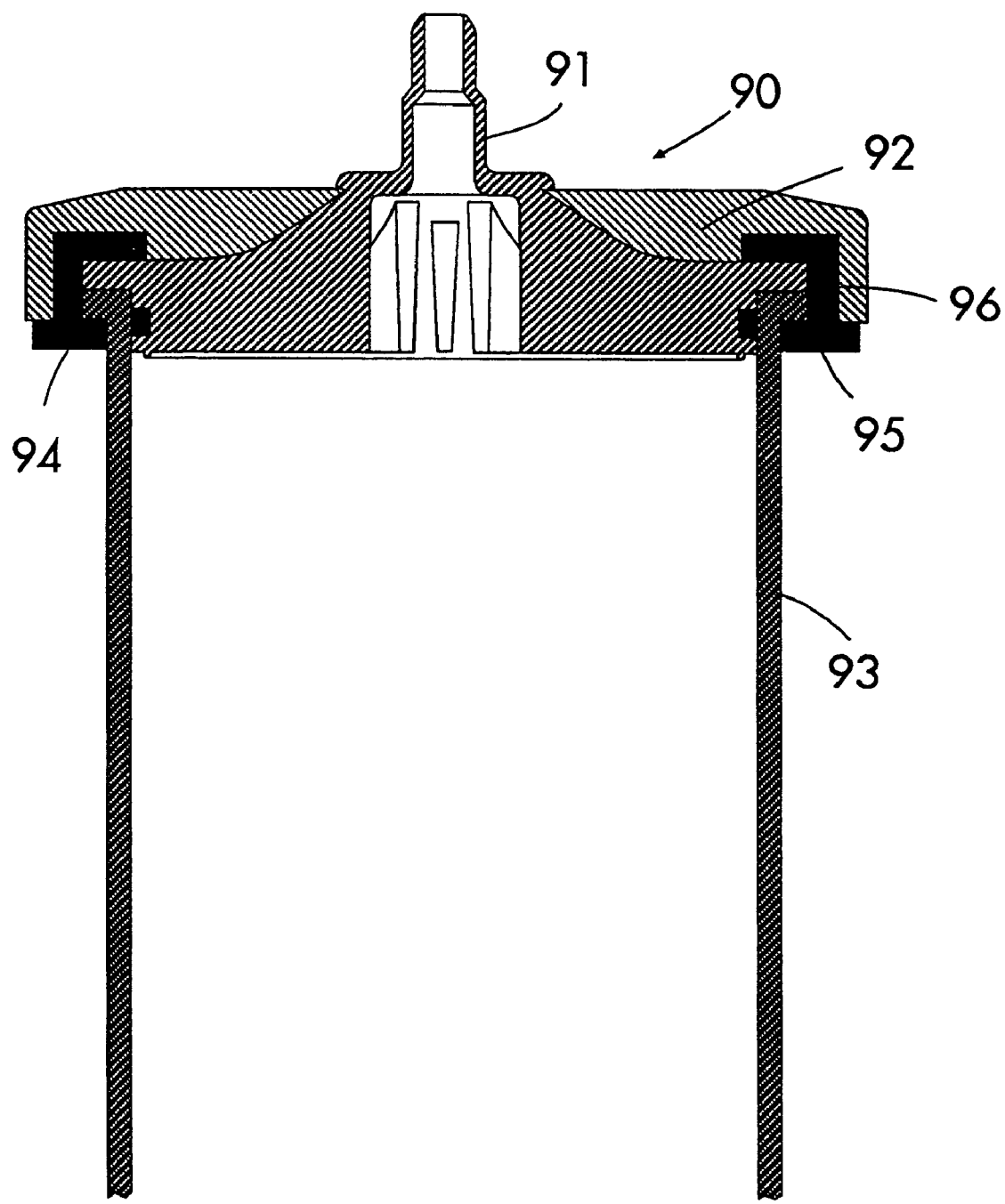
FIG. 6 is a partial cross-sectional view of one end cap embodiment for the depth filter of this invention.

FIG. 6 shows another end cap design of the present invention. In this embodiment, the end cap assembly 90 is again two pieces, 91 and 92. The housing 93 has an outwardly extending flange 94. The first end cap piece 91 is placed on top of the end of the housing 93 and flange 94 as shown and retained to the housing via a clamp or C-ring 95. The outer end cap piece 92 is snap fit or otherwise retained on to the inner cap piece 91. As can be seen the outer portion of the inner end cap piece 96 is a flange which is substantially co-extensive with the flange 94 of the housing 93. The design of this embodiment eliminates the need to machine the slot into the inner wall of the housing while providing the good seal and compressibility of the other embodiments.

Figure 7:
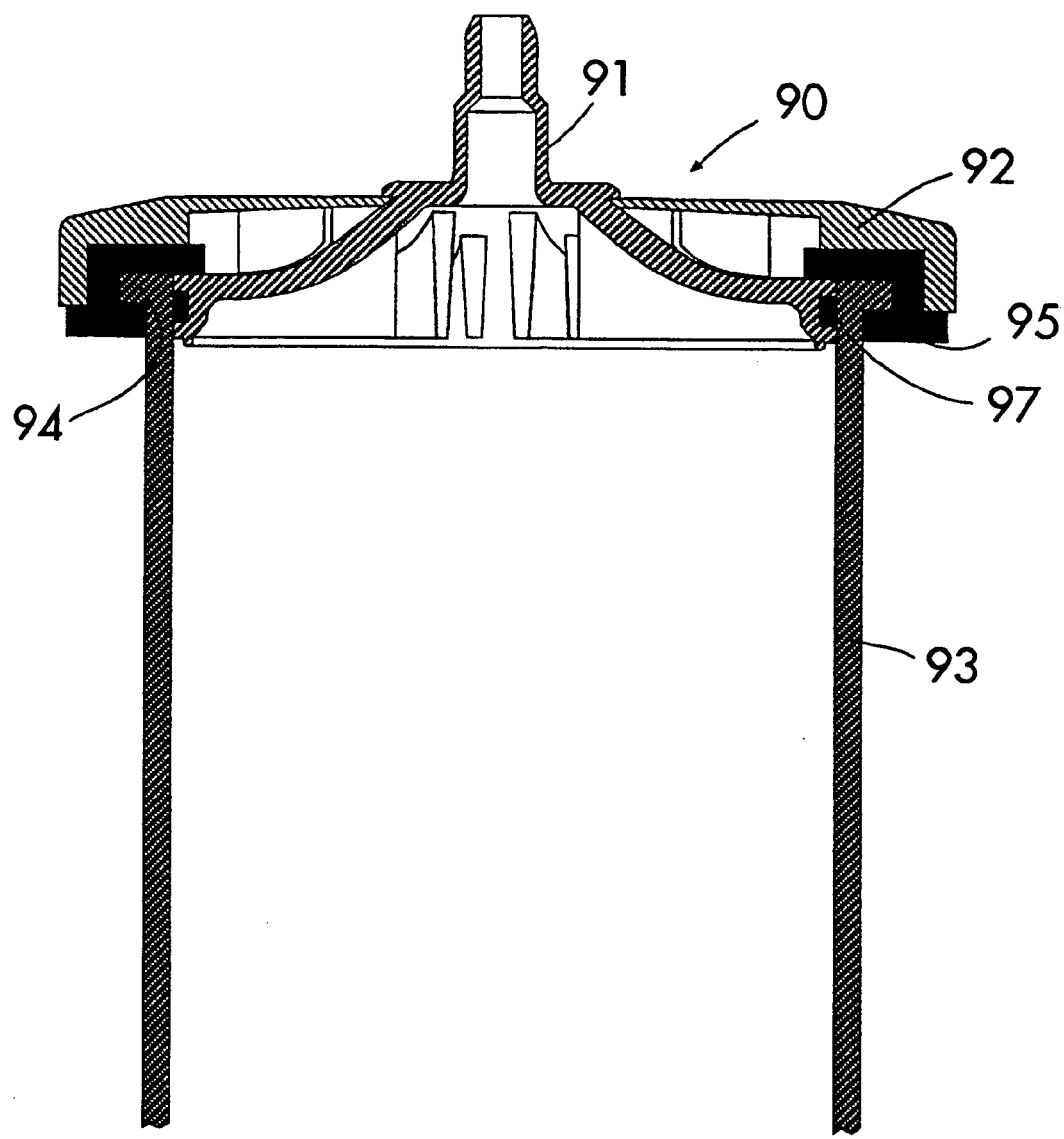
FIG. 7 is a partial cross-sectional view of one end cap embodiment for the depth filter of this invention.

FIG. 7 shows another embodiment which is a variation of the embodiment of FIG. 6. To the extent that the pieces represent the same item in both drawings, the same number has been used. The difference in this embodiment is that the outer edge 97 of the inner cap piece 91 is substantially equal to the inner diameter of the housing, but in no event is it greater than the inner diameter of the housing. It is still retained within the housing by the clamp or C-ring 95.

Figure 8:
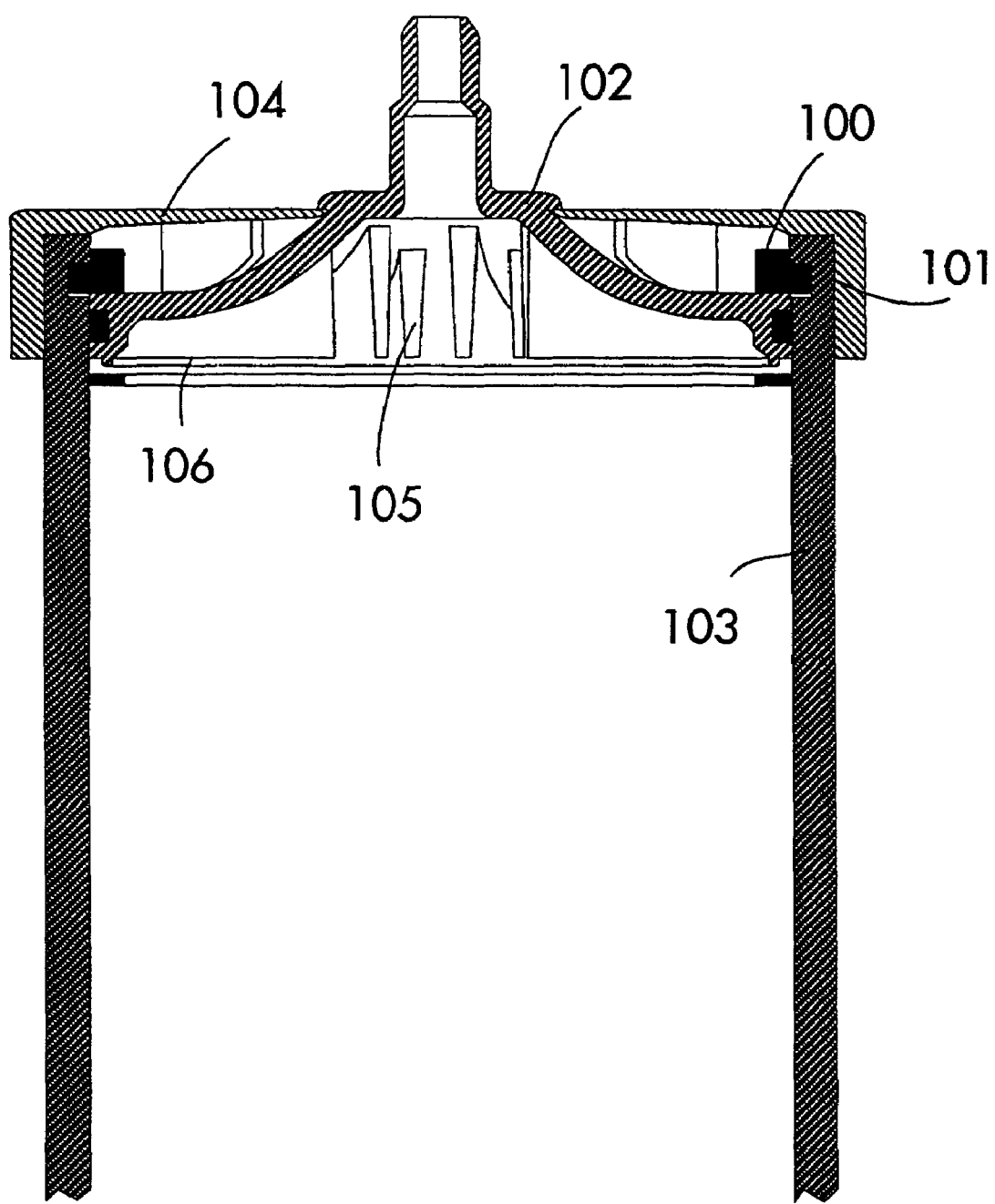
FIG. 8 is a partial cross-sectional view of one end cap embodiment for the depth filter of this invention.

FIG. 8 is a modification of FIG. 5. In this embodiment, there is no nib as in FIG. 5. Instead one relies upon a thicker, broader flange 100 on the c-ring 101 to hold the inner cap piece 102 within the housing 103 and to prevent any flexing of either the inner piece or outer cap piece 104 when under pressure. Additionally, ribs 105 extend downward from the outer cap piece 104 and touch the inner cap piece 102 providing additional strength and rigidity to the end cap design. Further the inner surface 106 of the inner cap piece 102 is formed as a series of fins rather than as a solid piece as was shown in other embodiments.

Figure 9:
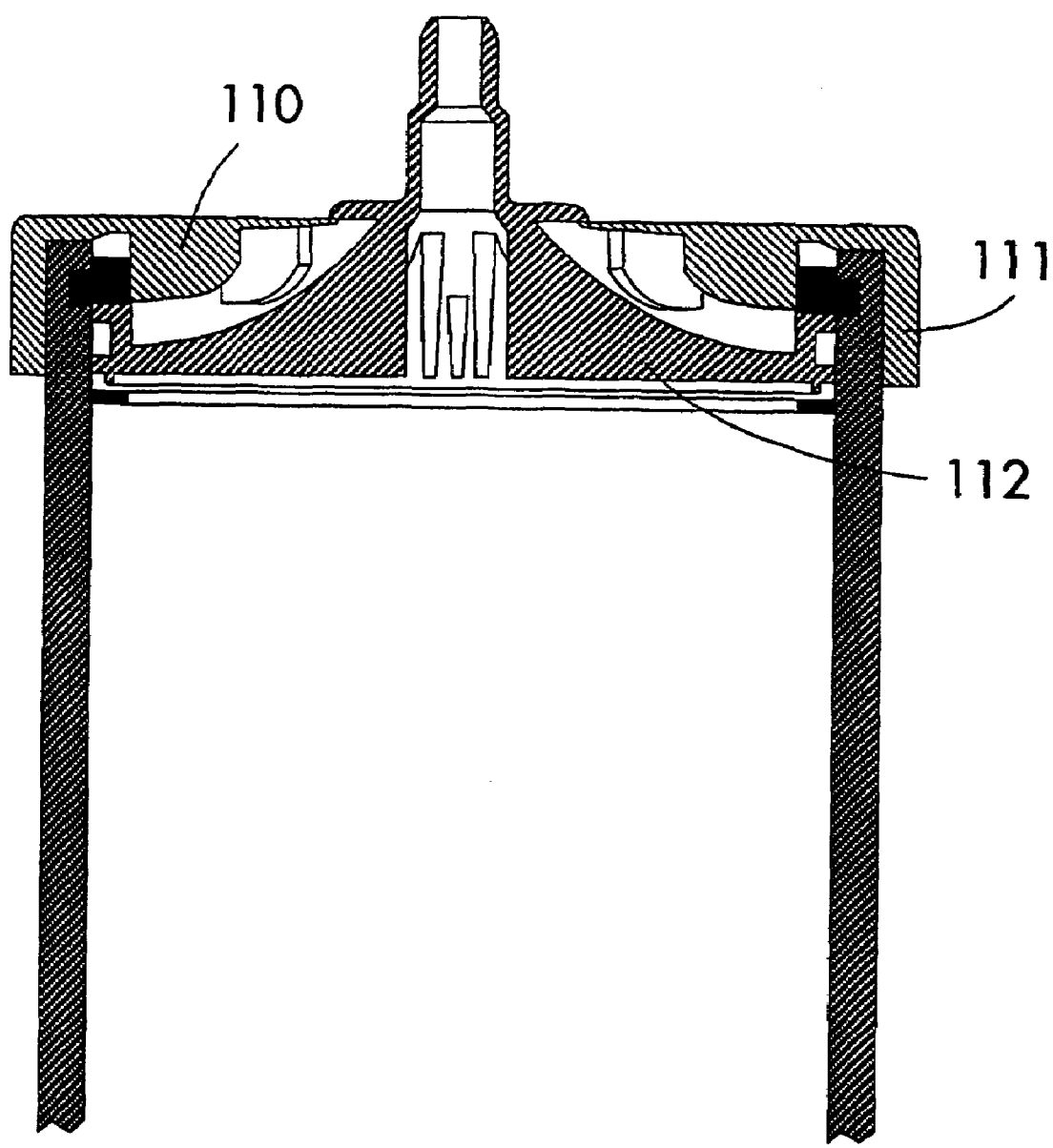
FIG. 9 is a partial cross-sectional view of one end cap embodiment for the depth filter of this invention.

FIG. 9 shows a modification of the design of FIG. 8 where in the ribs 110 on the outer cap piece 111 do not touch the inner cap piece 112. The inner cap piece 112 is a solid piece unlike that of the embodiment of FIG. 8.

Lastly, other embodiments can also be used to attach the end caps to the housing such screw threads formed on the housing and the end cap (not shown) or heat bonding the end caps to the housing (not shown). Any such design is acceptable so long as it forms a leak proof seal which is capable of compressing the depth media and which is capable of withstanding any pressure it may normally be subjected to.

EXAMPLE 1

Figure 10:
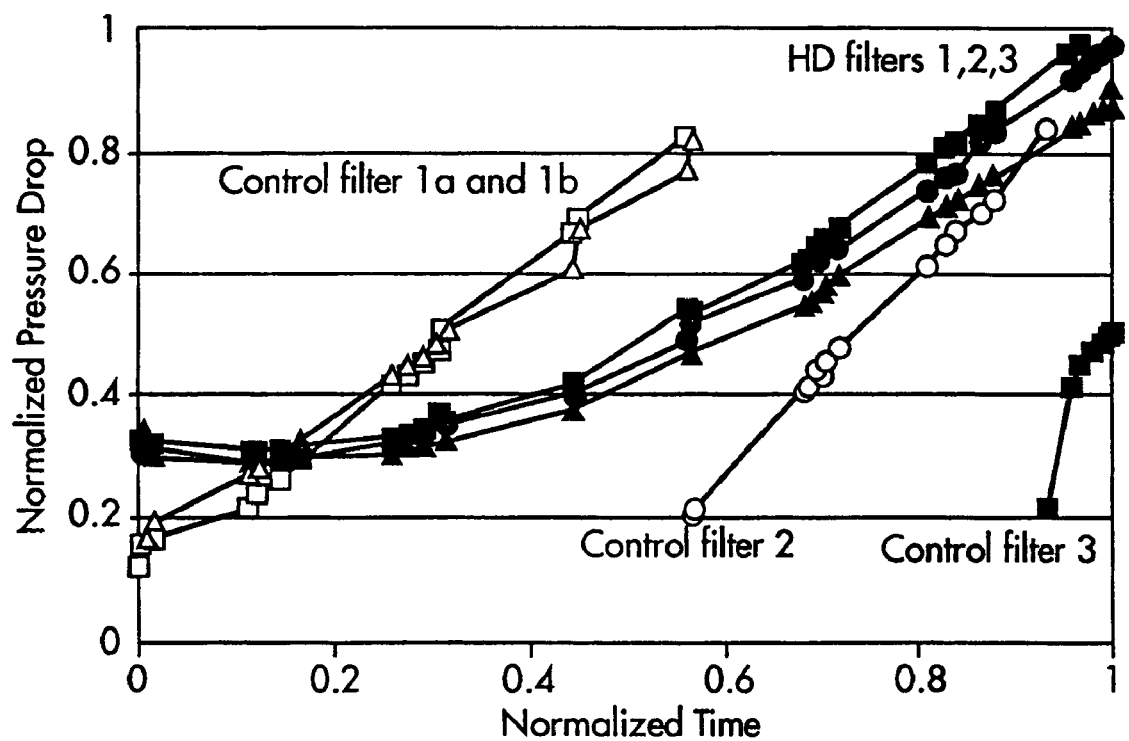
FIG. 10 is a graph showing the test results of Example 1.

This example illustrates the use of the filter cartridge of this invention as shown in FIG. 1. The results are shown in FIG. 10. In FIG. 10, the filter cartridges of this invention are identified as "HD filters 1,2,3" and included 70 annular spacers separated by filter segments made of polyproplene melt-blown and spun-bond fibers having a height of between 0.10 and 0.18 with a total height of 9.1 inches. The control filters 1a and 1b had the following construction: spun-bond and melt-blown fibers formed into a series of sequentially tighter cohesive fabrics and wrapped around a perforated core. The control filter 2 had the following construction: spun-bond and melt-blown fibers formed into a series of sequentially tighter cohesive fabrics and wrapped around a perforated core.

A diluted silica slurry comprising 12 percent silica particles by weight was filtered through each of the filter cartridges. Control filter 2 was brought on line after filters 1a and 1b plugged. Control filter 3 was brought on line after control filter 2 plugged. The slurry was circulated through the filters from a 20 gallon tank at a constant flow rate of 250 ml/min. The pressure drop across each filter was monitored to determine the extent of loading on the filter. When the initial control filter (1a and 1b) plugged, a second control fitter (2) was brought on line to test against the filter of this invention. A third control filter (3) was brought on line after the second control filter was plugged.

As shown in FIG. 10, the depth filter construction of this invention have a useful life about 2.5 times the useful life of a conventional filter when filtering a slurry.

The invention claimed is:

1. A filter cartridge for filtering a slurry composition which comprises:
   a hollow housing having a first end cap including an inlet and a second end cap including an outlet;
   an annular spacer having an open portion and a solid portion and a nonwoven depth filter material of polymeric fibers inside the housing, said depth filter material having a thickness to retain undesirably large particles of said slurry while permitting passage there through of particles of said slurry within a desired size range, said depth filter material having progressively smaller micron particle retention in the direction of fluid flow, said retention greatest adjacent the fluid outlet wherein said filter material is formed of at least two segments and separated by said annular spacer;
   an open void volume of not greater than 1 inch in height to prevent separation of solid particles from the slurry composition and provide substantially uniform distribution of slurry over atop surface of the depth filter material, said open void volume upstream of said depth filter and the ratio of the height of said depth filter segments to the height of said annular spacers being between about 1:1 and about 5:1.

2. The filter cartridge of claim 1 wherein said annular spacers have a thickness less than about 0.12 inches.

3. The filter cartridge of claim 2 wherein said depth filter segments comprise a wound depth filter comprising nonwoven fibers.

4. The filter cartridge of claim 2 wherein said depth filter segments comprise a stack of sheets wherein each sheet comprises nonwoven fibers.

5. The filter cartridge of claim 4 wherein the first endcap has ribs, said ribs distribute incoming fluid feed over atop surface of the depth filter material, said ribs have a height that prevents separation of solid particles from the slurry to be filtered.

6. The filter cartridge of claim 2 wherein said depth filter segments comprise a fibrous mass of nonwoven polymeric fibers secured together by mechanical entanglement of the fibers.

7. The filter cartridge of any one of claims 2, 3, 4 or 6 wherein the ratio of depth filter segment thickness to spacer thickness is from about 1.1:1 to about 5:1.

8. The filter cartridge of claim 7 wherein the ratio of depth filter segment thickness to spacer thickness is from about 1.5:1 to about 3:1.

9. The filter cartridge of any one of claims 1, 2, 3, 4 or 6 wherein the housing is free of an open void volume downstream of said depth filter.

10. The filter cartridge of any one of claims 1, 2, 3, 4 or 6 wherein the depth filter inserted into the housing is precompressed into its final length.

11. The filter cartridge of any one of claims 1, 2, 3, 4 or 6 wherein the media has a surface treatment selected from the group consisting of hydrophobicity, hydrophilicity or a positive or negative charge.

12. A process for filtering a slurry which comprises passing a slurry through a filter cartridge as defined in any one of claims 1, 2, 3, 4 or 6 and; recovering a filtered slurry from said cartridge.

13. The process of claim 12, wherein said slurry is selected from the group consisting of a silica-based slurry, an alumina-based slurry, a ceria-based slurry, a diamond-based slurry, a $MnO_2$— based slurry, a cell broth, a photoresist chemical, a fermentation liquid, blood, a blood fraction and a transgenic liquid.

14. The filter cartridge of claim 2 wherein the first endcap has ribs, said ribs distribute incoming fluid feed over atop surface of the depth filter material, said ribs have a height that prevents separation of solid particles from the slurry to be filtered.

15. The filter cartridge of claim 1 wherein the first endcap has ribs, said ribs distribute incoming fluid feed over atop surface of the depth filter material, said ribs have a height that prevents separation of solid particles from the slurry to be filtered.

16. The filter cartridge of claim 1 wherein the first endcap and the second endcap have ribs, said ribs distribute incoming fluid feed over atop surface of the depth filter material, said ribs have a height that prevents separation of solid particles from the slurry to be filtered.

* * * * *